US010668556B2

(12) United States Patent
Horino et al.

(10) Patent No.: US 10,668,556 B2
(45) Date of Patent: Jun. 2, 2020

(54) DIRECT RESISTANCE HEATING SIMULATION METHOD

(71) Applicant: NETUREN CO., LTD., Tokyo (JP)

(72) Inventors: Takashi Horino, Tokyo (JP); Akira Terajima, Tokyo (JP); Fumiaki Ikuta, Tokyo (JP); Hiroki Inoue, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 223 days.

(21) Appl. No.: 15/558,745

(22) PCT Filed: Jun. 24, 2016

(86) PCT No.: PCT/JP2016/003072
§ 371 (c)(1),
(2) Date: Sep. 15, 2017

(87) PCT Pub. No.: WO2016/208204
PCT Pub. Date: Dec. 29, 2016

(65) Prior Publication Data
US 2018/0104761 A1  Apr. 19, 2018

(30) Foreign Application Priority Data

Jun. 26, 2015 (JP) .................................. 2015-129319

(51) Int. Cl.
*G06F 17/50* (2006.01)
*B23K 11/11* (2006.01)
(Continued)

(52) U.S. Cl.
CPC ............. *B23K 11/115* (2013.01); *B23K 11/26* (2013.01); *B23K 11/314* (2013.01); *G06F 30/23* (2020.01); *G06F 2113/24* (2020.01)

(58) Field of Classification Search
CPC .................................................... G06F 3/041; G06F 30/23; G02F 1/29; G01N 3/18
(Continued)

(56) References Cited

U.S. PATENT DOCUMENTS 1,004,800 A * 10/1911 Luckett .................... A24C 1/02
131/42
6,057,523 A   5/2000 Fujii et al.
(Continued)

FOREIGN PATENT DOCUMENTS

JP        10-094883      4/1998
JP       2010-230331    10/2010
(Continued)

OTHER PUBLICATIONS

Pradeep et al., "Process Parameter Optimization in Resistance Spot Welding of Dissimilar Thickness Materials", Intl. Science Index, Mechanical and Mechatronics Engineering, 8(1): 80-83 (2014).
(Continued)

*Primary Examiner* — Thai Q Phan
(74) *Attorney, Agent, or Firm* — Wenderoth, Lind & Ponack, L.L.P.

(57) ABSTRACT

A direct resistance heating simulation method is provided. In this method, a welding region and its peripheral region of steel sheets to be welded by a pair of electrodes are divided into a plurality of elements. A coupled analysis is performed such that a temperature, a metal structure, stress and strain at each element are determine in a mutually associated manner based on Joule loss obtained through a current analysis and a magnetic field analysis for each element. The coupled analysis is repeated to predict an effect of one or more parameters, including at least one of a frequency, a magnitude and an application time of electric current to be applied to the electrodes, a cooling time, a pressure applied
(Continued)

from the electrodes to the steel sheets and a shape of the electrodes, on welding quality after a post-heating by direct resistance heating and to improve weld strength.

6 Claims, 7 Drawing Sheets

(51) Int. Cl.
*G06F 30/23* (2020.01)
*B23K 11/26* (2006.01)
*B23K 11/31* (2006.01)
*G06F 113/24* (2020.01)

(58) Field of Classification Search
USPC .............................................. 703/18, 19, 2, 5
See application file for complete search history.

(56) References Cited

U.S. PATENT DOCUMENTS

| | | | | |
|---|---|---|---|---|
| 8,918,657 | B2* | 12/2014 | Cameron | G06Q 50/06 |
| | | | | 713/300 |
| 9,625,767 | B2* | 4/2017 | Li | G02F 1/29 |
| 10,076,026 | B2* | 9/2018 | Frey | G06F 3/041 |
| 10,144,087 | B2* | 12/2018 | Iqbal | C22C 27/04 |
| 10,345,656 | B2* | 7/2019 | Li | G02F 1/29 |
| 2006/0180577 | A1* | 8/2006 | Lindeman | G01N 3/18 |
| | | | | 219/50 |
| 2009/0177328 | A1* | 7/2009 | Finley | H02K 15/165 |
| | | | | 700/275 |
| 2012/0129006 | A1 | 5/2012 | Kanai et al. | |
| 2015/0289366 | A1* | 10/2015 | Frey | G06F 3/041 |
| | | | | 174/250 |
| 2016/0368080 | A1 | 12/2016 | Hatta et al. | |

FOREIGN PATENT DOCUMENTS

| | | |
|---|---|---|
| JP | 2013-022637 | 2/2013 |
| WO | 2011/013793 | 2/2011 |
| WO | 2014/208747 | 12/2014 |

OTHER PUBLICATIONS

Srikunwong et al., "Numerical Simulation of Resistance Spot Welding Process Using Fea Technique", Proceedings of 13th International Conference on Computer Technology in Welding: 1-12 (2003).

Murakawa, "Simulation of Resistance Welding for Selection of Optimum Welding Conditions and Process Control", Trans. JWRI, 32(1): 215-218 (2003).

Hernandez et al., "A study on heat affected zone softening in resistance spot welded dual phase steel by nanoindentation", J Mater Sci, 45(6): 1638-1647 (2010).

Murakawa et al., "Development of Finite Element Method for Seam Welding and Its Application to Optimization of Welding Condition", Proceedings of the Twelfth (2002) International Offshore and Polar Engineering Conference: 344-347 (2002).

International Search Report and Written Opinion of the International Searching Authority, issued Sep. 30, 2016 in corresponding International Patent Application No. PCT/JP2016/003072.

* cited by examiner

[Fig. 1]
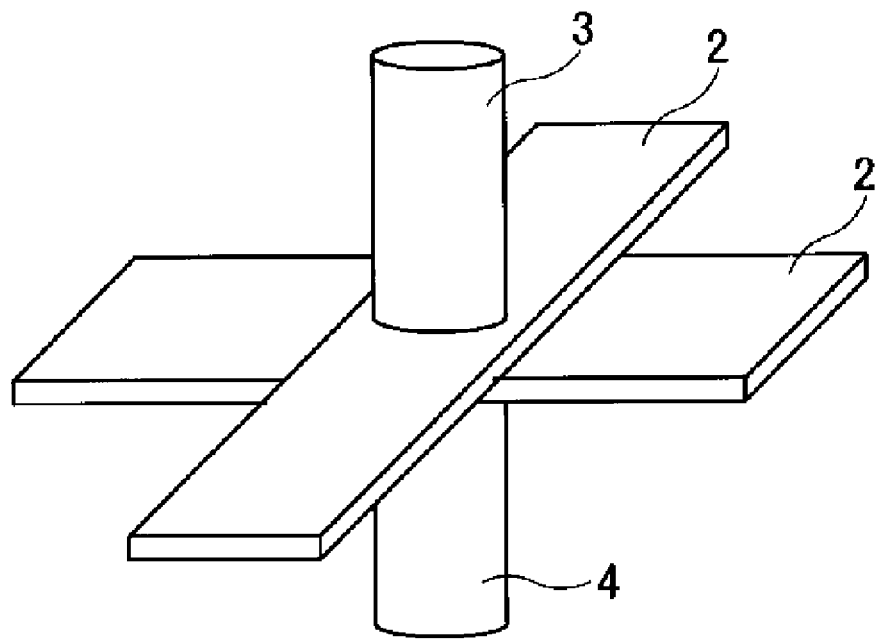

[Fig. 2]
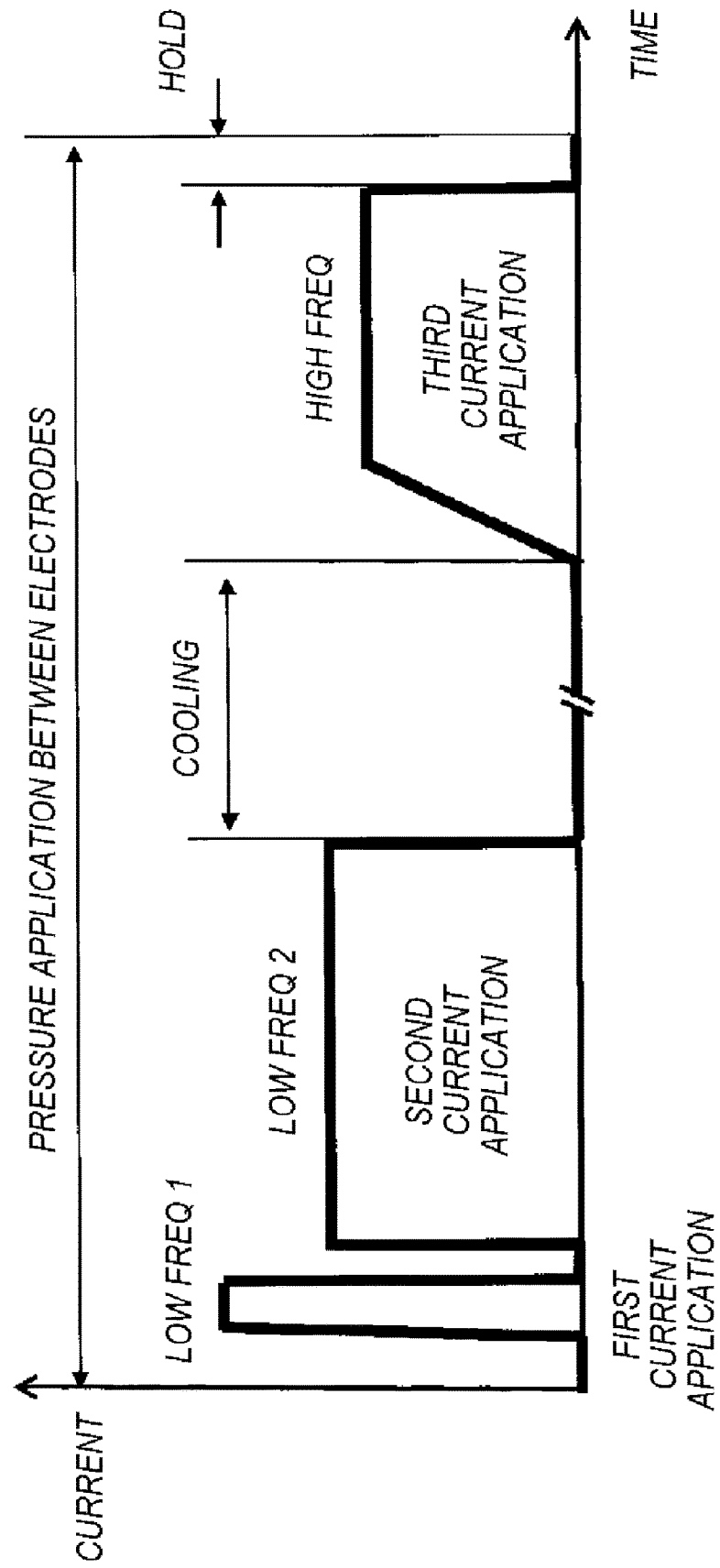

[Fig. 3]
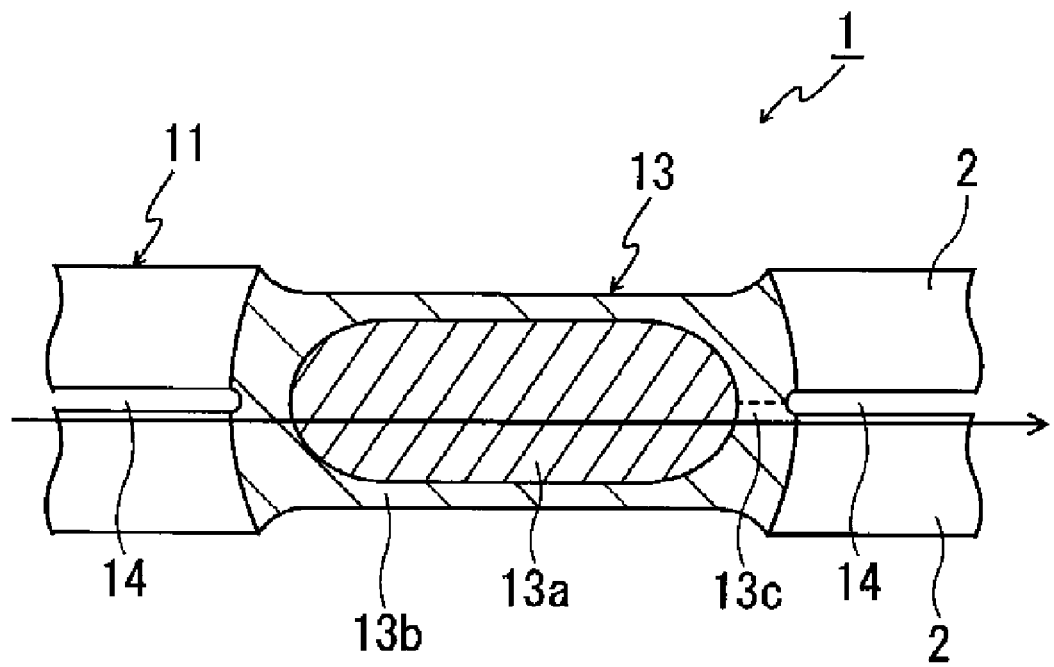
[Fig. 4]
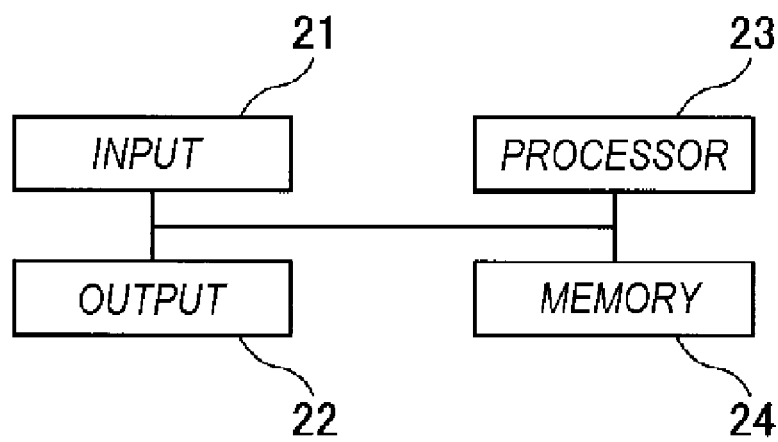

[Fig. 5]
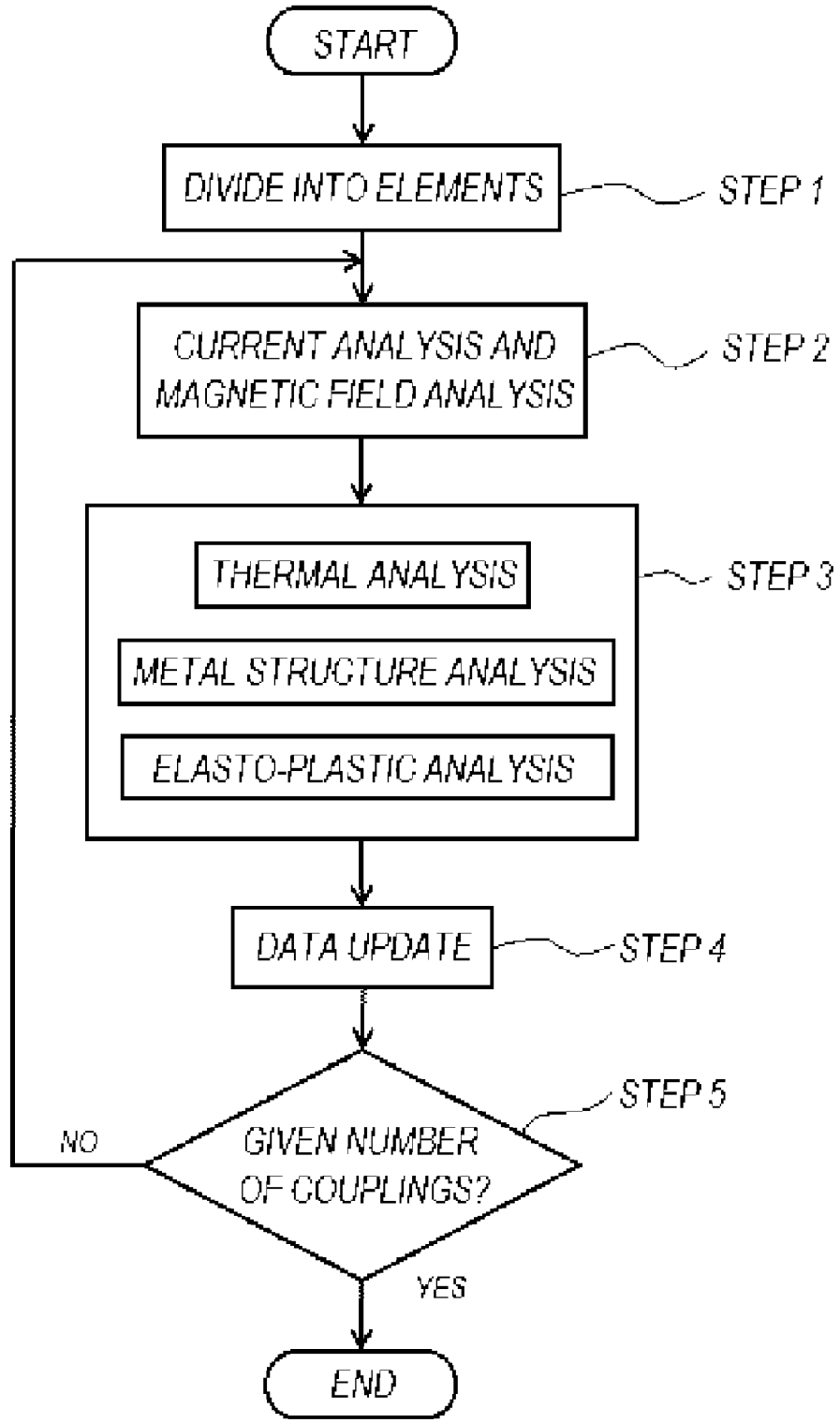

[Fig. 6A]
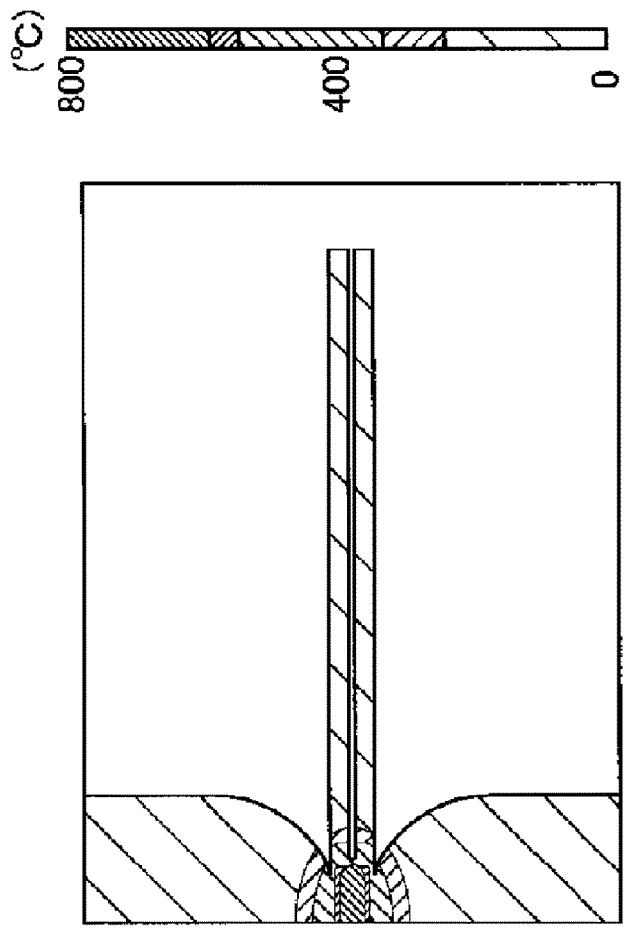
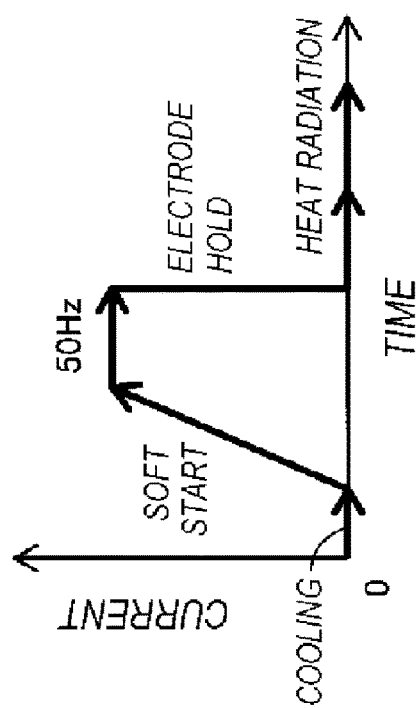

[Fig. 6B]
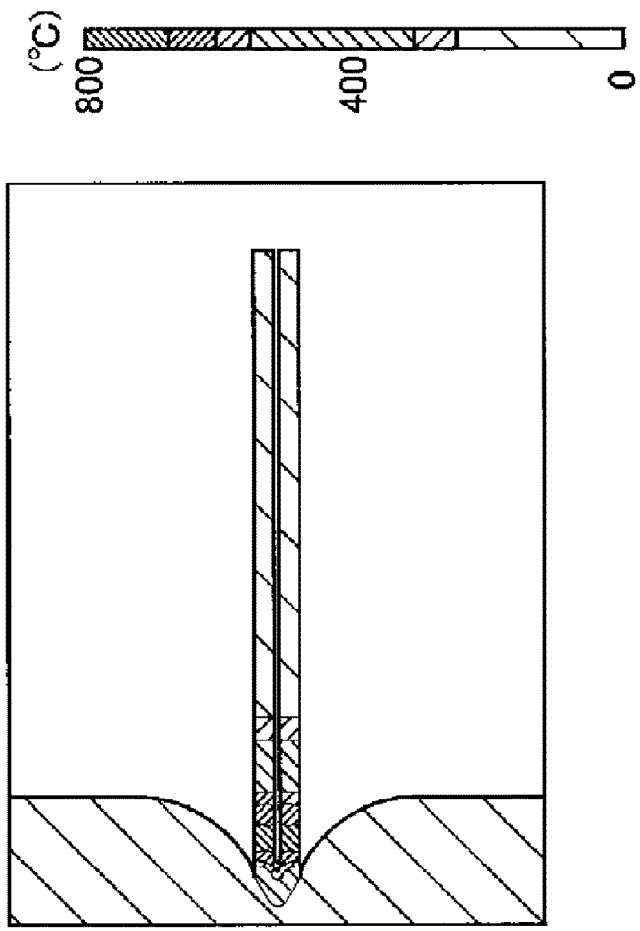
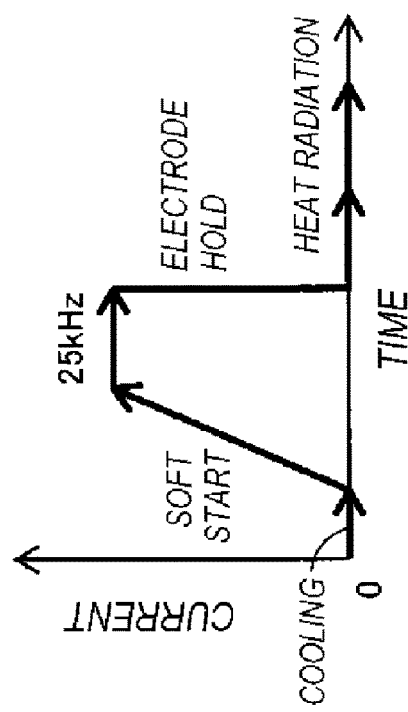

[Fig. 7]
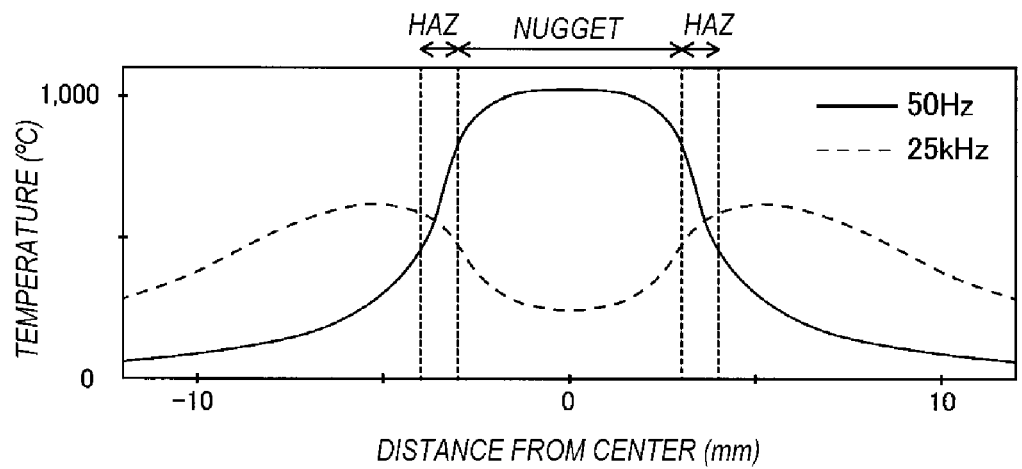
[Fig. 8]
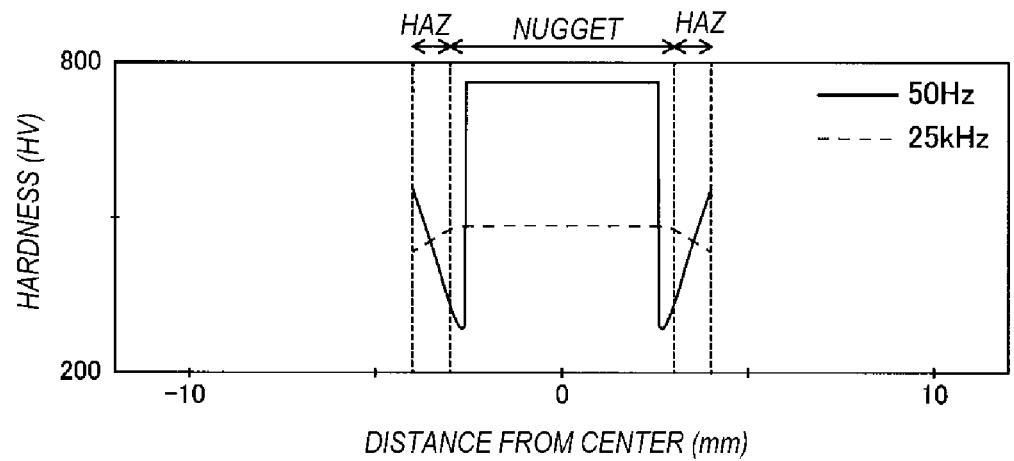

… (1) …

DIRECT RESISTANCE HEATING SIMULATION METHOD

TECHNICAL FIELD

The present invention relates to a method for simulating a direct resistance heating as a post-heating of steel sheets after joining the steel sheets together by welding.

BACKGROUND ART

A related art computer simulation technology uses a finite element method to predict a shape of a heating coil, a shape of a cooling jacket, and/or heat treatment conditions such as high-frequency heating conditions and cooling conditions in advance, and also to predict deformation, strain and heat treatment quality of a metal workpiece (see, e.g., JP2010-230331A).

A resistance spot welding is one of the methods for welding a plurality of steel sheets that are placed on top of one another. In the resistance spot welding, the steel sheets are placed on top of one another and held between a pair of electrodes, and electric current is applied between the pair of electrodes in a state in which the steel sheets are pressed in a direction along the electrode rods. The pressure contact portions of the steel sheets are then subjected to resistance heating and melted, and the melted region is then solidified into a lump. This melted and solidified portion is called a nugget (see, e.g., WO2011/013793A1 and WO2014/208747A1).

The related art, e.g., JP2010-230331A cited above, merely discloses a general computer simulation technology, and does not specifically disclose how it can be applied to resistance spot welding.

SUMMARY

Illustrative aspects of the present invention provide a method for simulating a direct resisting heating of steel sheets after joining the steel sheets together by resistance welding, thereby being able to predict conditions for achieving a desired weld strength.

According to an illustrative aspect of the present invention, a direct resistance heating simulation method includes dividing a welding region and a peripheral region of a plurality of steel sheets into a plurality of elements, the welding region being a region in which the steel sheets are placed on top of one another and joined together by applying electric current between a pair of electrodes in a state in which the steel sheets are held between the pair of electrodes, and the peripheral region being peripheral to the welding region, obtaining an amount of Joule loss at each element of the steel sheets by a current analysis and a magnetic field analysis using a finite element method, performing a coupled analysis such that a temperature, a metal structure, stress and strain at each element are determined in an mutually associated manner based on a distribution of Joule loss at each element of the steel sheets, and repeating the coupled analysis to predict an effect of one or more parameters on welding quality after a post-heating by direct resistance heating and to improve weld strength, the one or more parameters including at least one of a frequency, a magnitude and an application time of the electric current to be applied to the pair of the electrodes, a cooling time, a pressure applied from the pair of electrodes to the steel sheets, and a shape of the electrodes.

According to another illustrative aspect of the present invention, a non-transitory computer readable medium is provided. The non-transitory computer readable medium stores a program that, when executed by a computer, causes the computer to execute the method described above.

According to another illustrative aspect of the present invention, a program is provided. The program causes a computer to execute the method described above.

With the present invention, when joining the steel sheets by welding, joining quality such as a temperature distribution and a hardness distribution can be simulated by repeating a current analysis, a magnetic field analysis, a thermal analysis, a metal structure analysis and an elasto-plastic analysis, so as to predict the effect of the one or more parameters on the welding quality after the post-heating by high-frequency direct resistance heating, whereby it is possible to find conditions regarding the one or more parameters for obtaining a desired weld strength and to ensure efficiency and quality of the welded structure.

BRIEF DESCRIPTION OF DRAWINGS

FIG. 1 is a perspective view of a welded structure to be fabricated by a resistance spot welding and a post-heating by direct resistance heating that are to be simulated according to an embodiment of the present invention.

FIG. 2 is an example of a time chart of the resistance spot welding and the post-heating by direct resistance heating.

FIG. 3 is a schematic view of a cross section of the welded structure that is obtained by the resistance spot welding and the post-heating by direct resistance heating.

FIG. 4 is a block diagram of a computer for executing a simulation program according to an embodiment of the present invention.

FIG. 5 is a flow chart of a simulation method to be executed by the computer when the simulation program is executed by the computer.

FIG. 6A illustrates an example of a simulation result including a temperature distribution with a frequency of the direct resistance heating as the post-heating being 50 Hz.

FIG. 6B illustrates an example of a simulation result including a temperature distribution with a frequency of the direct resistance heating as the post-heating being 25 kHz.

FIG. 7 is a distribution diagram regarding the results of the simulation shown in FIGS. 6A and 6B, the distribution diagram showing a temperature distribution in relation to the distance from the center.

FIG. 8 is a distribution diagram showing, as another example of simulation results, the hardness in relation to the distance from the center.

DESCRIPTION OF EMBODIMENTS

Hereinafter, embodiments of the present invention will be described in detail with reference to the drawings.

FIG. 1 is a perspective view of a welded structure to be fabricated by a resistance spot welding and a post heating by direct resistance heating that are to be simulated according to an embodiment of the present invention, and FIG. 2 is an example of a time chart of the resistance spot welding and the post-heating by direct resistance heating. In the resistance spot welding, for example, as shown in FIG. 1, a plurality of steel sheets 2, 2 are placed on top of one another and held between a pair of electrodes 3, 4 in a pressed manner, and the overlapped portions of the steel sheets are melted by applying direct current or low-frequency current to the pair of electrodes 3, 4 for a short time and then solidified. A nugget (melted and solidified portion) is formed by the resistance spot welding. The melting and solidification correspond to heating by "first current application" and "second current application" shown in FIG. 2. In the first current application, oxidized scale attaching to the steel sheets is removed. In the second current application, electric current is applied for a period longer than that of the first current application, whereby the steel sheets are welded to each other, a nugget is generated, and buckling occurs and a navel section is generated.

Furthermore, the state in which the plurality of steel sheets 2, 2 being held between the pair of electrodes 3, 4 and pressurized at a predetermined pressure is maintained in the simulation program for the embodiment of the present invention. The pair of electrodes 3, 4 being internally water-cooled continuously makes contact with the plurality of steel sheets 2, 2, whereby the nugget is cooled by heat removal. Then, when the cooling period immediately after the second current application elapses, high-frequency electric current is applied to the pair of electrodes 3, 4 for a short time, whereby the nugget and its periphery and a heat-affected zone (HAZ) are heated. As a result, a heat storage ring having a wide range can be formed around the nugget. The heat of this heat storage ring is transferred to the interior of the inside from the heat storage ring and to the exterior of the outside from the heat storage ring, and the nugget is tempered by the heat transfer to the interior. This heating by the application of electric current corresponds to the heating by the "third current application" shown in FIG. 2.

FIG. 3 is a schematic view of a cross section of the welded structure that is obtained by the resistance spot welding and the post-heating by direct resistance heating. The welded structure 1 has a welded portion 13 and a non-welded portion 11. The non-welded portion 11 keeps the same structure as before the welding. The welded portion 13 has a nugget (melted and solidified portion) 13a, a heat-affected zone (HAZ) 13b surrounding the nugget 13a, and a corona bond 13c formed in the HAZ 13b at the boundary between the HAZ 13b and the steel sheets 2, 2. A clearance 14 is generated at the boundary between the HAZ 13b and the steel sheets 2, 2.

In the embodiment according to the present invention, as shown in the time chart of FIG. 2, the resistance spot welding by the first current application and the second current application and the tempering treatment by post current application indicated as third current application after the passage of the cooling period are subjected to computer simulation to optimize the conditions of the heat treatment including the spot welding.

FIG. 4 is a block diagram of a computer for executing the simulation program according to the embodiment of the present invention. The computer includes an input means 21, an output means 22, a processor 23 and a memory 24. The simulation program is stored in the memory 24 (a non-transitory computer readable medium), and executed by the processor 23, whereby the simulation relating to the welding is executed.

FIG. 5 is a flow chart of a simulation method according to an embodiment of the present invention. At step 1, a welding region and its peripheral region of a plurality of steel sheets are divided into a plurality of elements, the welding region being a region in which the steel sheets are placed on top of one another and joined together by applying electric current to a pair of electrodes in a state in which the steel sheets are held between the pair of electrodes. In this step, the overlapped portions (may also be described a welded portion) and its surrounding portions of the steel sheets are divided into a plurality of elements, and the pair of electrodes is also divided into a plurality of regions. At this step, the number and the thickness of the steel sheets may be set by setting initial conditions of the respective elements at the start of the simulation and by setting information on physical property of material such as electrical conductivity, specific permeability, heat, phase transformation, stress-strain, etc., as material information for each element.

In the case that the electrodes 3, 4 are symmetric as shown in FIG. 1, the time for cal-culation processing is shortened by dividing the left or right half of the region of the cross section including the shaft of the electrode shown in FIG. 1 into a plurality of elements. The dividing method for step 2 and the dividing method for step 3 to be described later may be made different from each other.

At step 2, the amount of the Joule loss at each element in the steel sheets is obtained by current analysis and magnetic field analysis. "Each element in the steel sheets" herein means each element of a portion having a resistance and includes each element of a portion in which the steel sheets are melted and solidified. For each element, electrical conductivity and specific permeability are set in the region of the steel sheets and the region of the electrodes depending on the states thereof, and the faces along which current flows have been determined by the contact faces of the pair of electrodes making contact with the steel sheets. Hence, the current flowing through each element can be obtained by simultaneously forming Kirchhoff's current/voltage relational ex-pressions. Consequently, the amount of the Joule loss is obtained from the electric current flowing through each element and the resistivity thereof. For the stage in which a low-frequency (includes commercial frequency) current is applied, a satisfactory result is obtained by solely using the current analysis. For the stage in which a high-frequency current is applied, the magnetic field analysis may be additionally used, and Maxwell's electromagnetic equations may be formed. One or more parameters are set as conditions for the analysis. The one or more parameters includes at least one of the frequency, the magnitude, the application time of the electric current to be applied to the pair of electrodes, the cooling time, the pressure applied from the pair of electrodes to the steel sheets, and the shape of the electrodes (including dimensions of the electrode).

At step 3, the heat generation amount at each element is obtained from the amount of the Joule loss at each element in the plurality of steel sheets obtained at step 2. Then, a coupled analysis is performed such that the temperature, the metal structure, the stress and the strain of each element are associated with each other based on the heat generation amount at each element, whereby the stress, the strain and the metal structure (metal composition volume fraction) are obtained for each element. At step 3, a thermal analysis, a metal structure analysis and an elasto-plastic analysis are performed sequentially or repeatedly, and the respective results thereof are associated with each other, whereby the coupled analysis is performed. With this analysis, the temperature, the strain, the stress and the metal structure of each element are predicted. The analysis is performed for each element by associating the temperature, the elasto-plastic structure and the phase transformation with each other. The analysis is performed by obtaining the heat generation amount at each element from Joule loss at each element obtained at step 2, and by using, for example, a thermal conduction equation.

More specifically, at step 3, the element for the analysis is defined as necessary and the following information is set.

Firstly, an isothermal transformation diagram and a continuous cooling transformation diagram for a steel material; phase transformation characteristic information, such as austenite transformation temperature information, martensite transformation temperature information and melting start temperature information; thermal conduction characteristic information relating to thermal conductivity, specific heat, density, latent heat (melting latent heat, for example) for the steel material; and stress-strain physical property information, such as Young's modulus, Poisson's ratio, linear expansion coefficient, yield point, work hardening coefficient, transformation expansion coefficient, and transformation plasticity coefficient, are used as material physical property information on each material of the steel sheet.

Secondly, the value of the heat transfer coefficient for cooling the interior of the electrode is set. This setting is performed in consideration of heat removal due to the contact of the electrode to the steel sheet.

Thirdly, the amount of Joule loss of each element obtained at step 2 is set.

Fourthly, the heating time, the frequency in the cooling period and the number of couplings are set as information on analysis conditions.

At step 3, on the basis of the data having been set as described above, analysis is performed using a finite element method to obtain the temperature and the metal composition volume fraction at each element. The volume fraction is indicated by the ratios of respective structures, such as ferrite, perlite, austenite, martensite and bainite. As a result, the temperature, the displacement amount, the stress-strain and the metal composition volume fraction serving as the metal composition of each element are obtained. Furthermore, since the plurality of steel sheets are held and pressurized by the pair of electrodes, the pressure from the outside is considered for each element of the steel sheets making contact with the electrodes in the stress-strain analysis at step 3.

Since the temperature of each element changes as the result of each analysis at step 3, the electrical conductivity and the specific permeability of each element are updated, and the contact resistivity and the contact thermal conductivity of the electrodes are changed in consideration of the change in the contact area between the steel sheets and the change in the contact area between the steel sheet and the electrode at step 4. Then, the processing returns to step 2 until the number of couplings reaches a given number. When the number of couplings reaches the given number, the results are output. In the "cooling period" shown in FIG. 2, the processing may merely be advanced to step 3 instead of returning from step 5 to step 2 and without performing the current analysis. Since the frequencies of the current in the "first current application", the "second current application" and the "third current application" shown in the time chart of FIG. 2 are different in order from one another, the frequencies are changed.

With the embodiment according to the present invention, the current density distribution, the temperature distribution and other various distributions in accordance with the passage of time are output as the results of the simulation program. Furthermore, when the post-heating by direct resistance heating is completed, only step 3 is repeated, whereby the temperature distribution for heat radiation after the completion of the heating can be obtained.

With the embodiment according to the present invention, the distribution of hardness can be obtained by converting a tempering parameter into hardness using a master tempering curve and based on the temperature history of each element in the welding region. The hardness after tempering is affected by tempering temperature and holding time. Therefore, the tempering parameter P defined below is used as an index.

$$P=T(C+\log t)$$

Here, T is the tempering temperature in absolute temperature, t is tempering time, and C is a constant depending on the material and is determined by the ratio of carbon in the material.

In the case that experiment results being actually different in the combination of the tempering temperature and the tempering time are summarized by representing the hardness after tempering on the vertical axis and by representing the tempering parameter on the horizontal axis, if the same material is used, a single master tempering curve is drawn, whereby the converted hardness is obtained according to the temperature/time history.

Hence, the region between the nugget and the HAZ formed by the spot welding and the steel material portion not affected by the spot welding can be made lower than the nugget in hardness and higher in toughness. The frequency, the current value, the current application time and the cooling time of the current and other parameters, required for this purpose, can be predicted.

Moreover, with the embodiment of the present invention, one or more parameters are varied so that, based on the distribution of the hardness, the hardness of the HAZ becomes lower than that of the nugget formed by the resistance spot welding, whereby parameters for the resistance spot welding and the post-heating by direct resistance heating (conditions constituting the time chart) that satisfy the above condition can be obtained.

The method of using the simulation program according to the embodiment of the present invention will be described below.

As a first method, at the start of the "first current application" shown in FIG. 2, the temperature of the material is set to the room temperature serving as the environmental temperature thereof, and various physical property information and dimensional information of the steel material serving as a material are set. Hence, the resistance spot welding by the "first current application" and the "second current application" and the tempering treatment using the post-heating by direct resistance heating by the "third current application" can be simulated totally.

As a second method, the temperature of the material immediately after the completion of the "second current application" shown in FIG. 2 is obtained experimentally or predicted by performing a simulation separately or obtained by combining these, and then the portions and the physical property information of the steel material, the nugget and the HAZ being in the state of spot welding immediately after the completion of the "second current application" are set. Furthermore, the temperature of each element is set to the temperature immediately after the completion of the "second current application". Consequently, the tempering treatment using the post-heating by direct resistance heating by the "third current application" can be simulated.

Next, examples of actual simulation results will be described. The second method described above is used. A separate simulation is performed in the period from the "first current application" to the immediately after the "second current application", and the portions and the physical property values of the steel material, the nugget and the HAZ immediately after the completion of the "second current application" are set, and a simulation for the tempering treatment using the post-heating by direct resistance heating by the "third current application" is performed.

As the steel material, S45C is used, and the steel material for the simulation has a length of 86 mm on one side and a thickness t of 1.2 mm. The electrode is made of copper and has a diameter of 16 mm and a length of 16 mm.

FIGS. 6A and 6B illustrate, as examples of simulation results, temperature distributions with a frequency being a parameter. FIG. 6A illustrates a simulation result with the frequency being 50 Hz, and FIG. 6B illustrates a simulation result with the frequency being 25 kHz. In each drawing, a time chart of a heating cycle is shown on the left, and a temperature distribution of a post-heating by high-frequency direct resistance heating is shown on the right as a simulation result. According to the temperature distribution, it is found that the temperature indicated by a denser mesh is higher.

The following is found from the results of the simulation. As shown in FIG. 6A, the temperature at the portion held between the pair of electrodes is the highest with the frequency for the direct resistance heating as post-heating is low, 50 Hz. On the other hand, as shown in FIG. 6B, the temperature at the portion (the HAZ) away from the portion held between the pair of electrodes is the highest with the frequency for the direct resistance heating as the post-heating is high, 25 kHz.

FIG. 7 is a distribution diagram regarding the simulation results illustrated in FIGS. 6A and 6B and shows the temperature distribution in relation to the distance from the center. FIG. 7 indicates the temperature values at the respective locations along the line indicated by an arrow and located 0.2 mm below the vertical direction center line in the sectional view of FIG. 3. When the frequency in the post heating by the direct resistance heating is a commercial frequency of 50 Hz, the temperature becomes the highest at of the nugget. On the other hand, when the frequency in the post heating by the direct resistance heating is 25 kHz, the temperature becomes highest at an area adjacent to the nugget. It is thus predicted that heat is transferred from the ring section having the highest temperature to the nugget and that desirable tempering treatment can be performed at the HAZ.

As described above, the portion that is most desired to be heated by the post heating can be specified by changing the frequency depending on the steel sheet, the sheet thickness, the diameter of the nugget, etc.

Hence, also in the design of a heating cycle, even when the frequency in the post-heating by direct resistance heating is taken as one example, the optimal frequency can be predicted without performing welding using an actual machine experimentally, although such experimental welding has been required conventionally, whereby try-and-error times can be reduced drastically. Furthermore, although the temperature distribution can be estimated, for example, by color with the naked eye, it is difficult to eliminate the subjectivity of an inspector. On the other hand, with the embodiment according to the present invention, the portion that is most desired to be heated by the post-heat electric heating can be specified by changing the frequency in the post-heating by direct resistance heating, whereby the size and position of the heat storage ring during the post-heating by direct resistance heating can be obtained. Hence, try-and-error repetition times using an actual machine can be reduced, and the frequency and magnitude of the current can be predicted in advance depending on the thickness and the composition of the steel material and the diameter of the nugget (the diameter of the spot welding electrode). Consequently, the desired welding quality is ensured.

Furthermore, since the temperature distribution during the post-heating by direct resistance heating can also be obtained, when the portion melted by the resistance spot welding is tempered, the portion can be heated to the temperature desired for the recovery of ductility and toughness. It is thus possible to obtain a guideline regarding where and to what extent the post-heating by direct resistance heating should be performed. Hence, a desired welded structure can be obtained by performing the resistance spot welding using the various parameters having been set as described above and then by performing the tempering treatment using the direct resistance heating as post-heating.

FIG. 8 is a distribution diagram showing an example of the results of the simulation and indicating the hardness depending on the distance from the center. FIG. 8 indicates the hardness values at the respective positions along the line indicated by the arrow and located 0.2 mm below the vertical direction center line in the sectional view of FIG. 3. The hardness is obtained using the tempering parameter as described above. The hardness values of the respective portions of the nugget and the HAZ can be obtained referring to FIG. 8. Hence, the conditions for the resistance spot welding and the tempering treatment can be predicted so that the hardness distribution corresponding to a desired high weld strength is obtained.

In the results of the simulation, the frequency of the electric current applied in the post-heating by direct resistance heating is used as a parameter. Other parameters may include the magnitude and the application time of the electric current to be applied to the pair of electrodes, the cooling time, the pressure applied from the pair of electrodes to the steel sheets, the shape of the electrodes (including dimensions of the electrodes). The desired weld strength can be obtained by predicting how one or more parameters affect the welding quality after the post-heating by high-frequency direct resistance heating.

With the embodiment of the present invention, in the resistance spot welding of the plurality of steel sheets and the tempering treatment using the high-frequency direct resistance heating as post-heating, the resistance spot welding conditions and the tempering conditions capable of attaining high joining strength (may also be referred to as weld strength) can be predicted.

With the embodiment of the present invention, by the setting of the electrical conductivity and the specific permeability of each element at step 1 and other steps, the simulation can also be performed in the case that two or more steel sheets are welded, and the simulation can also be performed in the case that the plurality of steel sheets are different in thickness.

While the present invention has been described with reference to certain embodiments thereof, the scope of the present invention is not limited to the embodiments described above, and it will be understood by those skilled in the art that various changes and modifications may be made therein without departing from the scope of the present invention as defined by the appended claims.

For example, instead of performing the "second current application" and the "third current application" separately as shown in the heating time chart of FIG. 2, electric current of difference frequencies may be applied to the pair of electrodes to perform welding and tempering simultaneously. Alternatively, a low-frequency current may be applied first and a high-frequency current may be applied later in a superimposed manner, and then only the high-frequency current may be applied. The flow chart shown in FIG. 5 may be modified in accordance with such modifications of the heating time chart. The simulation program according to the embodiment of the present invention is adapted for simulating the resistance welding to join a plurality of steel sheets by welding and for simulating the post-heating by direct resistance heating. That is, the simulation program may be used as a simulation program for simulating the post-heating by direct resistance heating with the resistance welding condition being given or as a simulation program for simulating both the resistance welding and the post-heating by direct resistance heating.

Further, while the present invention has been described with reference to the resistance spot welding, this is merely an example, and the present invention is applicable to other types of resistance welding, such as a seam welding, and to a tempering using a direct resistance heating as post-heating after the welding.

This application is based on Japanese Patent Application No. 2015-129319 filed on Jun. 26, 2015, the entire content of which is incorporated herein by reference.

The invention claimed is:

1. A direct resistance heating simulation method comprising:
dividing a welding region and a peripheral region of a plurality of steel sheets into a plurality of elements, the welding region being a region in which the steel sheets are placed on top of one another and joined together by applying electric current between a pair of electrodes in a state in which the steel sheets are held between the pair of electrodes, and the peripheral region being peripheral to the welding region;
obtaining an amount of Joule loss at each element of the steel sheets by a current analysis and a magnetic field analysis using a finite element method;
performing a coupled analysis such that a temperature, a metal structure, stress and strain at each element are determined in an mutually associated manner based on a distribution of Joule loss at each element of the steel sheets; and
repeating the obtaining the amount of Joule loss and performing of the coupled analysis to predict an effect of one or more parameters on welding quality after a post-heating by direct resistance heating and to improve weld strength, the one or more parameters including at least one of a frequency, a magnitude and an application time of the electric current to be applied to the pair of the electrodes, a cooling time, a pressure applied from the pair of electrodes to the steel sheets, and a shape of the electrodes.

2. The direct resistance heating simulation method according to claim 1, further comprising obtaining, as a result of the coupled analysis, a temperature distribution in the welding region and the peripheral region.

3. The direct resistance heating simulation method according to claim 2, further comprising obtaining a distribution of hardness into which a tempering parameter is converted based on a master tempering curve and based on a temperature history of each element in the welding region.

4. The direct resistance heating simulation method according to claim 1, further comprising obtaining a distribution of hardness into which a tempering parameter is converted based on a master tempering curve and based on a temperature history of each element in the welding region.

5. The direct resistance heating simulation method according to claim 4, further comprising obtaining, based on the distribution of the hardness, the one or more parameters that make the hardness of a heat-affected zone become lower than the hardness of a nugget formed by resistance spot welding.

6. A non-transitory computer readable medium storing a program that, when executed by a computer, causes the computer to execute a method comprising:
dividing a welding region and a peripheral region of a plurality of steel sheets into a plurality of elements, the welding region being a region in which the steel sheets are placed on top of one another and joined together by applying electric current between a pair of electrodes in a state in which the steel sheets are held between the pair of electrodes, and the peripheral region being peripheral to the welding region;
obtaining an amount of Joule loss at each element of the steel sheets by current analysis and magnetic field analysis using a finite element method;
performing a coupled analysis such that a temperature, a metal structure, stress and strain at each element are determined in a mutually associated manner based on a distribution of Joule loss at each element of the steel sheets; and
repeating the obtaining the amount of Joule loss and performing of the coupled analysis to predict an effect of one or more parameters on welding quality after a post-heating by direct resistance heating and to improve weld strength, the one or more parameters including at least one of a frequency, a magnitude and an application time of the electric current to be applied to the pair of the electrodes, a cooling time, a pressure applied from the pair of electrodes to the steel sheets, and a shape of the electrodes.

* * * * *